United States Patent [19]

Arnoldi et al.

[11] Patent Number: 5,541,284

[45] Date of Patent: Jul. 30, 1996

[54] METHOD FOR PROCESSING CRUDE POLYOXYMETHYLENE

[75] Inventors: Detlef Arnoldi, Weisenheim am Berg; Udo Gropp, Alsbach; Edwin Nun, Brachttal, all of Germany

[73] Assignee: Dequssa Aktiengesellschaft, Frankfurt am Main, Germany

[21] Appl. No.: 406,141

[22] Filed: Mar. 20, 1995

[30] Foreign Application Priority Data

Mar. 22, 1994 [DE] Germany ............... 4409744.1

[51] Int. Cl.⁶ ..................... C08G 2/10; C08G 2/28
[52] U.S. Cl. ............... 528/480; 528/481; 528/487; 528/488; 528/489; 528/491; 528/492; 528/495; 528/499; 528/501; 525/417; 525/472
[58] Field of Search ............... 528/480, 481, 528/487, 488, 489, 491, 492, 495, 499, 501; 525/417, 472

[56] References Cited

U.S. PATENT DOCUMENTS 3,027,352  3/1962  Walling et al. ............... 528/241
3,803,094  4/1974  Ishii et al. ............... 528/241
5,144,005  9/1992  Sextro et al. ............... 528/480

FOREIGN PATENT DOCUMENTS 7523485  7/1974  France .
1595340  8/1966  Germany .
1248939  8/1967  Germany .

*Primary Examiner*—Samuel A. Acquah
*Assistant Examiner*—P. Hampton-Hightower
*Attorney, Agent, or Firm*—Cushman Darby & Cushman

[57] ABSTRACT

The subject invention relates to method for processing crude polyoxymethylene in which the isolation of unstable components from crude polyoxymethylene, such as residual monomers which are at least partly in the form of cyclic formaldehyde derivatives, is effected by treatment of the crude polyoxymethylene with an inert gaseous medium. The method of the invention is characterized in that the gaseous medium contains at least 10 volume % of water vapor, and less than 0.1 volume % of a volatile base, and/or less than 1 volume % of a volatile solvent. In an alternative variant method, the gaseous medium contains at least 10 volume % of water vapor and the treatment occurs at a temperature between 114° C and the softening temperature of the crude polyoxymethylene and at a pressure of less $1.2 \cdot 10^5$ Pa.

13 Claims, No Drawings

METHOD FOR PROCESSING CRUDE POLYOXYMETHYLENE

FIELD OF THE INVENTION

The invention relates to methods for processing crude polyoxymethylene. More particularly, the invention relates to the isolation of unstable components from crude polyoxymethylene, such as residual monomer that is at least partially present in the form of cyclic formaldehyde derivatives. The method involves treatment of the crude polyoxymethylene with an inert gaseous medium for the dry expulsion of the residual monomer, prior to a possibly ensuing stabilization treatment.

BACKGROUND OF THE INVENTION

Polyoxymethylene (POM) is an extremely useful technical plastic, which because of its physical properties finds widespread use in the most various fields.

Polyoxymethylenes in the form of crude polymers generally have inadequate stability and must therefore be subjected to special processing steps before they can be processed into shaped bodies, filaments, films, and the like by conventional shaping methods.

Among the known provisions that may be employed to process and stabilize the crude polyoxymethylene are a) the deactivation of acidic catalyst components that are needed for the polymerization;

b) the removal of unconverted monomer from the crude polymer;

c) the removal or blocking of unstable chain ends; and/or d) the incorporation of stabilizers into the crude polymer in order to protect against heat, oxygen, light, acidic substances, and/or other substances harmful with respect to the raw polymeric material.

The aforementioned provisions are employed either alone or in combination. In the known processing and stabilization methods there is variance in how the various provisions are combined as well as the timing of their use in the method.

However, in many methods, particular attention is devoted to the deactivation of acidic catalyst components and the removal of residual monomer. For instance, it is known that the copolymerization of formaldehyde or cyclic oligomers of the formaldehyde, preferably 1,3,5-trioxane, with suitable comonomers such as cyclic ethers and acetals in the presence of cationic polymerization catalysts (U.S. Pat. Nos. 3,027,352 and 3,803,094) is generally incomplete. Depending on the polymerization method and conditions, for instance, from 10 to 50% of the monomers are unconverted in the reaction and remain in the polymerization aggregate, leaving it in gaseous form and/or in a form in which they are bound to the polymer. Isolating and recovering the unconverted monomers entails considerable expenditure of time and effort.

It is known that the processing of polyoxymethylene can be done by deactivating the catalyst used by means of basic additives in an aqueous phase or in an organic solvent, for trioxane, for instance, and by ensuing steps of filtration, washing and drying. This procedure is complicated, and large quantities of solvent are required in order to recover the monomer.

Isolation of the residual monomers from crude polyoxymethylene by treatment with an inert gas at elevated temperature (115° to 170° C.) in the presence of thermal stabilizers and/or gaseous deactivators, such as aliphatic amines, has also already been described. The deactivation, the removal of the residual monomers, and the incorporation of stabilizers are carried out simultaneously in a single method step. The disadvantage of this method is that the residual monomers have to be recovered from large quantities of vehicle gas. Further, the deactivators must be removed in quantity before the recovered monomers are re-used. The treatment times, ranging from 5 minutes to 8 hours, require correspondingly large-sized technical equipment (U.S. Pat. No. 3,210,322).

The use of solvents and deactivators in the gas phase, specifically in a certain temperature range that does not cause depolymerization of the resultant polyoxymethylene copolymers, is also known. In that process, melting of the polyoxymethylene is avoided. For this method, the significance of the temperature is greater, and various temperature ranges are given for different deactivators (German Patent Disclosure DE-OS 33 11 145).

It is also known that crude polyoxymethylenes in the absence of considerable quantities of trioxane, or in other words residual monomers, are broken down by acidic catalyst residues. One method therefore prescribes carrying out the deactivation of the catalyst residues prior to the removal of the residual monomers (U.S. Pat. No. 2,989,509).

As is clear from the above-cited patent applications and patents, the removal of residual monomer, or of other unstable volatile components of the crude polyoxymethylene, and the deactivation can be carried out either separately or in combination. Both steps can have a decisive effect on the quality of the final product.

As a rule, the removal of the unconverted monomer and the deactivation step, which are usually done together, are followed by the removal of unstable chain ends. This term should be understood to mean both the chemical reaction of splitting off of unstable chain ends and their physical isolation, for instance by raising the temperature and degassing.

A combination of residual monomer removal, deactivation, and removal of unstable chain ends is possible in principle. One example is German Patent Disclosure DE 12 46 244.

The German Patent Disclosure DE-OS 14 95 666 relates to a method for stabilizing polyoxymethylenes that contain hemiacetalic terminal groups, in which the raw polyoxymethylene copolymers are treated at temperatures from 100° C. to the sintering point of the polyoxymethylenes at a pressure higher than atmospheric pressure with saturated water vapor that contains from 0.1 to 10% of a volatile, basic catalyst and from 1 to 50% of a swelling agent.

The treatment of the crude polymers according to this reference is carried out essentially in the pressure vessel, while such swelling agents such as alcohol, ketones or ether and basic components such as ammonia or alkylamines are added in order to remove residual monomer and to split off unstable chain ends. In particular, according to DE-OS 14 95 666, no significant terminal group breakdown is achieved if treatment is done at atmospheric pressure.

Other methods describe the melting open of the polyoxymethylenes in the steps of deactivation and/or demonomerization and/or removal of unstable chain ends (DE-OS 37 03 790, DE-OS 37 38 632 and European Patent Disclosure EP 0 137 305 A3).

The targeted removal of unstable components and remaining monomers in a continuous melting process has also been described. In it, the crude polymer together with alkaline-acting compounds is rapidly melted while being intensively kneaded and is transported in the molten state through a zone that is under a vacuum to a degassing apparatus. It is considered that an essential step in this method is the crude polymer predominantly melts open with the aid of mechanical energy (Examined German Patent Disclosure DE-OS 12 46 244), with the addition of the aforementioned compounds that inactivate the catalyst residues. Suitable stabilizers may be added, simultaneously, with one of the processing steps or after it.

From the above-mentioned references, the significance of these processing steps for the commercial utility of the individual method and for the quality of the final products becomes clear. Thus depending on many individual variables (particle size of the crude polymer, temperature, dwell time, type and quantity of deactivator, type and quantity of catalyst, mechanical mixing, presence of stabilizers, etc.), more or less severe damage to the crude polymer can occur, which is expressed for example in a rise in the melting index and in unstable components.

It is also problematic that the residual monomers must sometimes be recovered from relatively large quantities of solvent or vehicle gas. If deactivators are present, then it is always also necessary to perform separation from the residual monomers. Consequently, recovery of the reusable residual monomers is complicated and uneconomical.

SUMMARY OF THE INVENTION

In view of the disadvantages of the prior art, it is therefore desirable to disclose a method that enables rapid, simple and economical processing of raw polyoxymethylenes and the generation of stable polymers. Moreover, the novel method should above all be suitable for continuous operation. In addition, the reusability of the isolated monomers should be possible without major effort.

These and other objects are achieved by the method of the invention which is characterized in that the crude polyoxymethylene is treated dry with a gaseous medium containing at least 10 volume % of water vapor. This medium is inert with respect to the crude polymer and contains less than 0.1 volume of a volatile base and/or less than 1 volume % of a volatile solvent.

The objects of the invention are also achieved by the method of the invention in which the raw polyoxymethylene is treated with a gaseous medium containing at least 10 volume % of water vapor, which medium is inert to the crude polymer, at a pressure of less than $1.2 \cdot 10^5$ Pa and at a temperature above 110° C. and below the softening temperature of the crude polyoxymethylene. Advantageous variants of the method of the invention are also effected.

DETAILED DESCRIPTION OF THE INVENTION

The main components of the polyoxymethylenes treated according to the invention may be homopolymers of formaldehyde or of trioxane, or copolymers of trioxane. They may have a linear structure, but may also be branched or cross-linked. They can be used either individually or in the form of mixtures.

The term "homopolymers of formaldehyde or trioxane" is understood to mean polymers of the kind whose hemiacetalic hydroxyl terminal groups are chemically stabilized, for instance by esterification or etherification, against breakdown. The term "copolymers of trioxane" is understood to mean copolymers comprising trioxane and at least one compound that is copolymerizable with trioxane.

Examples of such compounds that are copolymerizable with trioxane are cyclic ethers having from 3 to 5 and preferably 3 ring members, cyclic acetyls other than trioxane, in particular formals, having from 5 to 11 and preferably 5 to 8 ring members, and linear polyacetyls, in particular polyformals. These cocomponents are each used in quantities of from 0.01 to 20, preferably 0.1 to 10, and in particular 1:5 weight %.

As is well known in the art, formals are acetals of formaldehyde, that is, derivatives of $CH_2O$, which result from reaction with two moles of R—OH by separation of 1 mole of $H_2O$.

As comonomers, in particular compounds of the formula

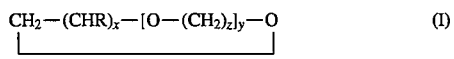

(I)

are suitable, in which R stands for a hydrogen atom, an alkyl radical having from 1 to 6 and preferably 1, 2 or 3 carbon atoms, for which 1, 2 or 3 halogen atoms, preferably chlorine atoms, may be substituted, an alkoxymethyl radical having from 2 to 6, preferably 2, 3 or 4 carbon atoms, a phenyl radical, or a phenoxymethyl radical. In a first preferred embodiment, the invention contemplates a cyclic structure having one oxygen in the ring structure, where x is an integer from 1 to 3, and y is equal to 0. In this embodiment, z need not be defined, since y is equal to 0.

In a second preferred embodiment, a direct cyclic structure is contemplated comprising alternating —O—$CH_2$ groups, where y is an integer from 1 to 3, x is equal to zero and z is equal to 2.

In a third preferred embodiment, a cyclic structure having exactly two oxygen atoms in the ring is contemplated, where z is an integer from 3 to 6, and preferably 3 or 4, and x is equal to 0 and y is equal to 1.

Suitable cyclic ethers include epoxy resins, such as ethylene oxide, styrene oxide, propylene oxide or epichlorohydrin, as well as glycidyl ethers of mono- or multivalent alcohols or phenols.

Suitable cyclic acetals include cyclic formals of aliphatic or cycloaliphatic α,ω-diols having from 2 to 8 and preferably 2, 3 or 4 carbon atoms, whose carbon chain may be interrupted at intervals of 2 carbon atoms by an oxygen atom, such as:

glycol formaldehyde acetal (1,3-dioxolane), propane diol formaldehyde acetal (1,3-dioxane), butane diol formaldehyde acetal (1,3-dioxopan), diglycol formaldehyde acetal (1,3,6-trioxocane), hexane diol formaldehyde acetal (1,3-dioxoxane), and butene diol formaldehyde acetal (1,3-dioxacycloheptene-5).

Acetals such as 4-chloromethyl-1,3-dioxolane that are not derived from α,ω-diols are also possible.

Also suitable, especially for preparing terpolymers of trioxane, are diformals or cyclic diethers, such as diglycerine diformal or butane diol diglycidyl ether.

Suitable linear polyacetals includes both homopolymers, and copolymers of the above-described acetals and linear condensates of aliphatic or cycloaliphatic α,ω-diols with aliphatic aldehydes or thioaldehydes, preferably formaldehydes. In particular homopolymers of cyclic formals of aliphatic α,ω-diols having from 2 to 8 and preferably 2, 3 or 4 carbon atoms are used, such as poly-(1,3- dioxalane), poly(1,3-dioxane) and poly(1,3-dioxepan).

The values for the coefficient of viscosity of the polyoxymethylenes used according to the invention (measured in a solution of the polymer in hexofluoroisopropanol, which is adjusted to a pH of from 8 to 9 with methanolic caustic soda, at 25° C. in a concentration of 0.3 g/100 ml) should amount in general to at least 160 (ml/g) and preferably be greater than 170 (ml/g). The crystallite melting points of the polyoxymethylenes are in the range from 140° to 180° C., preferably 150° to 170° C.; their densities amount to from 1.38 to 1.45 g·ml$^{-1}$ (measured in accordance with DIN 53 479).

The preferably binary or ternary trioxane copolymers used according to the invention are prepared in a known manner by polymerization (sometimes referred to as masspolymerization) of the monomers in the presence of cationically active catalysts at temperatures between 0° and 150° C., preferably between 70° and 140° C. (see DE-AS 14 20 283, for example). As catalysts, Lewis acids such as boron trifluoride or antimony pentafluoride, and complex compounds of such Lewis acids, preferably etherates, such as boron trifluoride diethyletherate or boron trifluoride di-tert-butyletherate are used, for example. Also suitable are protonic acids, such as perchloric acid, as well as saltlike compounds, such as triphenylmethyl hexafluoroborate, acetyl perchlorate, or esters of perchloric acid, such as methoxymethyl perchlorate or tert-butyl perchlorate. To regulate the molecular weight, any substances which are known to act as a chain transferer in the polymerization of trioxane can be used. The polymerization may be done in bulk, in suspension or in solution. Bulk polymerization denotes the polymerization without addition of solvent or detergent or the like. The monomer or the mixture of monomers is allowed to be liquid but when polymerization proceeds the viscosity is usually increasing and often, but not necessarily, the resulting product gets solid.

The homopolymers of the formaldehyde or trioxane that are used according to the invention are likewise prepared in a known manner by catalytic polymerization of the monomer (see German Examined Patent Disclosures DE-AS 10 37 705 and 11 37 215, for example), in which the polymer yields are between 70 and 95%, depending on the polymerization method and conditions, and the unstable hemiacetalic terminal groups are stabilized by etherification or esterification.

It was surprising and overcomes a previously existing prejudice that a treatment of the crude polyoxymethylene with a gaseous medium that has at least 10 volume % of water vapor and less than 0.1 volume % of a volatile base and/or less than 1% of a volatile solvent (that is, essentially in the absence of deactivators or other aids from a practical standpoint) is possible without damaging the crude polymer. Further processing of a crude polymer treated according to the invention can be done without difficulty. It is possible not to add stabilizers until during or shortly before the further processing. In particular, in the method of the invention, it is possible for the first time to store the demonomerized polyoxymethylene, without adding deactivators, for a relatively long time before reprocessing without harm to the crude polymer.

Within the scope of the invention, the phrases "treatment of the residual-monomer-containing polyoxymethylene dry with an inert gaseous medium", and "that residual monomer is expelled from the crude polyoxymethylene dry by treatment with a gaseous medium that is inert to polyoxymethylene" are not to be understood to mean that the crude polymer must be completely dry. On the contrary, some residual moisture, equivalent to the moisture of equilibrium under the treatment conditions, is tolerable.

As gaseous media for treating the crude polyoxymethylene, any substances or mixtures of substances that are chemically inert to it and are in gaseous form or are present in the form of a gas under the conditions of the treatment are possible.

These include, for example, argon, nitrogen or carbon dioxide. It is essential that the gaseous medium employed contain at least 10 volume % of water vapor. This water vapor content is necessary, since in residual monomer removal, the water vapor has an excellent "entraining action" in expelling the residual monomer. If less than 10 volume % of water vapor is used, the efficiency of the method of the invention is no longer satisfactory.

Regardless of any further variant of a method of the invention, a further property essential to the invention of the gaseous medium employed resides in its low content of volatile base and/or solvent. In combination with the use of a water-vapor-containing, dry, gaseous medium, the result of largely dispensing with the use of a volatile base and/or a volatile solvent is, surprisingly, a high quality of the treated polymer and at the same time avoidance of environmental pollution, since the volatile bases and/or solvents necessarily have disadvantages in this respect.

Slight quantities (up to 0.1 volume % of volatile base and/or up to 1 volume % of volatile solvent), however, can be tolerated in the method without effecting major disadvantages to the environment.

In an alternative method variant, the object of the invention is also achieved in that the gaseous medium containing 10 volume % of water vapor is employed at very specific temperatures and essentially without pressure. At a pressure of less than 1.2·10$^5$ Pa and at a temperature above 114° C., the residual monomer to be removed will have adequate volatility. At the same time, by adhering to a temperature below the softening temperature of the crude polyoxymethylene, melting open or baking on thereof is averted. At a temperature of less than 114° C. and at virtually no pressure, it is not possible to assure that the residual monomer will be expelled to an adequate extent.

In an especially preferred embodiment, the crude polyoxymethylenes are treated by the method of the invention, wherein the gaseous medium contains at least 10 volume % of water vapor and contains at most the slight aforementioned proportions of volatile base and/or volatile solvent (but preferably being free thereof), at a pressure of less than 1.2·10$^5$ Pa and at a temperature of between 114° C. and the softening temperature of the polyoxymethylene to be treated. By combining these provisions and properties, it is possible in a simple and extremely practical way to produce polyoxymethylenes having a residual monomer content of less than 2 weight %.

As already noted, the treatment temperature of the polyoxymethylene may be of decisive significance for the success of the residual monomer removal. Preferably, therefore, the temperature is high enough that the substances to be removed are already in gaseous form, and low enough that the polyoxymethylene is not damaged.

A preferred temperature range between 115 and 135° C. Most preferably, the residual monomer removal is carried out at between 120° and 130° C.

The treatment time is essentially noncritical. Naturally the time must be adequate for intensive contact, but it should not be too long, either, in order to avoid unnecessary thermal stress on the polymer. Within the scope of the invention it has proved to be advantageous if the gaseous medium can act upon the crude polyoxymethylene for between 10 and 300 minutes, and preferably between 30 and 180 minutes. The best results are obtained with these contact times.

According to the invention, gaseous media such as argon, nitrogen, carbon dioxide or mixtures of these inert substances, are used, in each case with a water vapor content of at least 10 volume %. A surprising feature of the method which simplifies the procedure and thereby makes it extremely practical is that simply pure pressureless superheated water vapor can be used as the gaseous medium. In other words, an inert vehicle gas is not absolutely necessary. On the other hand, the presence of oxygen from the air must be precluded, because it can cause severe damage to the crude polymers.

The pressureless superheated water vapor is passed through the crude polyoxymethylene, preferably in concentrations of from 1 to 200 g, and most preferably 10 to 70 g, per kg of crude polyoxymethylene and per hour.

The intensity of contact between the gaseous medium and the crude polymer can be increased within the scope of the invention, for instance by providing that the crude polyoxymethylene is comminuted immediately after its polymerization and prior to the treatment with the gaseous medium.

For continuous demonomerization of crude oxymethylene polymer, temperature-stabilizable shaft dryers that taper toward the bottom are preferably employed. Mixing is then omitted, and pressureless superheated water vapor is injected into the lower region of the shaft dryer so that it flows through from bottom to top. In the process, contacting of the polyoxymethylene takes place in a countercurrent process, and preferably the mixture of water vapor and residual monomer produced can condense at approximately 60° to 80° C. Selectively, the condensate is delivered to a further separate processing operation.

Advantages of the monomer removal according to the invention include the following:

- There is a greater throughput of crude polymers as a result of aggregates that remove unstable chain ends and residual monomers.
- The volume of the condensates of the water vapor and of the removed monomers is slight.
- There is less burden on monomer recovery systems and hence higher capacities, resulting from higher trioxane contents in the condensates of the demonomerization steps. The condensates can be delivered directly to processing steps for monomers, without the otherwise usual steps of concentrating them.
- There is avoidance of the baking on or clumping together of the crude polymers that otherwise usually occurs, because of residual monomer when cold- stored for relatively long periods.

The invention will be described in further detail below in terms of examples.

Residual Monomer Determination

To determine the residual monomers, such as residual trioxane, a sample of 50 g of crude polymer is boiled for 30 minutes in reflux in 300 ml of 0.1% ammonium carbonate solution, plus 20 ml of methanol. After chilling, filtration by suction is done via a G3 glass filter, and washing is done in three portions with a total of 500 ml of deionized water. The still-moist crude polymer, freed of residual monomer, is dried at 90° C. in a vacuum for 3 hours. The mass difference from the initially weighed amount is indicated in the form of weight % of trioxane and is equivalent to the maximum content of residual monomer.

Materials Used

POM 1:

Crude polymer from Ultraform GmbH with 2.5% dioxepan as a comonomer. After the polymerization, the copolymer was broken up and ground; 98% of the particles had a diameter of less than 3.25 mm. The catalyst in the comminuted crude polymer was deactivated, and the crude polymer was buffered but not stabilized.

POM 2:

Material from laboratory production with a 2.5 weight % comonomer content, inactivated with gaseous ammonia, but without the addition of buffer substances or antioxidants. During the gassing, this product was ground into particles of less than 4 mm.

POM 3:

Material from laboratory production with 2.5 weight % dioxacycloheptane (1,3-dioxepan) as a comonomer. Grinding was done in the presence of nitrogen. No antioxidants and/or buffers were added. The particle size was equivalent to that of POM 2.

POM 4:

Copolymer from Ultraform GmbH with 2.5 weight % of 1,3- dioxacycloheptane (1,3-dioxepan) as a comonomer, but without any addition whatever of antioxidants or buffers. The particle sizes were in accordance with those of POM 1.

EXAMPLES

Experiment 1 (V1)

The removal of trioxane from crude oxymethylene copolymer was done in a laboratory apparatus comprising a temperature-stabilizable, mixing and receiving flask with a 2 l capacity, into which water vapor was passed over the crude polymer heated to 126° C. 51.9 g of steam per hour and per kg of crude oxymethylene copolymer was supplied. The treatment time was 2 h. The mixture of trioxane and water vapor produced was condensed in a condenser heated to 45° C., and the surface of the condenser was completely moistened with condensate pumped in circulation from the collecting vessel. 100 ml of water was placed beforehand in the collecting vessel for the condensate. 1287.1 g of POM 1 was used as the crude polymer. The results are summarized in Table 1.

Experiment 2 (V2)

In the same apparatus as in Example 1, 1100 g of POM 2 were heated to 130° C., and 18 g of water vapor per kg of crude POM and per hour were passed through for 2 h. The vapor mixture of water and trioxane produced was condensed as in Experiment 1. The results are summarized in Table 1.

Experiment 3 (V3)

Apparatus and procedure as in Experiment 2. 1100 g of POM 2 were used. 18 g of water vapor per hour and per kg of crude POM were fed in. Demonomerization was done for 3 h at internal temperatures of 128° C. The results are summarized in Table 1.

Example 1 (B1)

1131 g of POM 3 were subjected to a flow in the equipment from comparison experiment 1 of 61 g of pressureless water vapor per hour and per kg of crude polymer, at 130° C. The results are summarized in Table 1.

Example 2 (B2)

640 g of POM 3 were placed in a vertical, double-walled glass tube with an internal diameter of approximately 30 mm. Without mixing of the crude polymer, the jacket temperature was adjusted to 125° C., and 48 g of water vapor per hour and per kg of crude polymer were passed through the crude polymer for 3 h. The condensation of the vapor mixture of water and trioxane produced took place in a descending cooler, whose surface was moistened entirely with condensate pumped in circulation. 100 ml of water were placed beforehand in the collecting vessel. The results are summarized in Table 1.

Example 3 (B3)

After flushing with nitrogen, approximately 200 kg of POM 4 were placed in a discontinuously operated plowshare mixer with a temperature-stabilizable jacket. With a slowly rotating mixing device (16 rpm), 25 g of water vapor per hour and per kg of crude polymer were fed in continuously at a polymer temperature of 125° C. The condensation of the mixture of trioxane and water took place in a Venturi scrubber operated as a condenser. The duration of the experiment was 2.5 h. The results are summarized in Table 1.

Example 4 (B4)

In the same technical apparatus as in Example 3, under otherwise unchanged conditions from Example 3, approximately 200 kg of POM 4 were demonomerized with 20 g of steam per hour and per kg of crude polymer. The duration of the experiment was 90 minutes. The results are summarized in Table 1.

Example 5 (B5)

Similarly to Example 4, approximately 200 kg of POM 4 were demonomerized at 120° C. and with 15 of water vapor per kg of crude polymer and per hour in the technical apparatus of Example 3. The duration of the experiment was 90 minutes. The results are summarized in Table 1.

From Table 1 it is clear that in each case an extensive demonomerization by the method according to the invention was achieved. The proportion of trioxane in the crude polymer (in weight %, referred to the total mass of POM prior to the demonomerization) dropped markedly (see the column headed "After"). Moreover, no essential damage to the POM occurred in this treatment, which can be concluded from the nonexistent to slight loss in molecular weight calculated from the respective change in MFI (i.e., MFI (after) minus MFI (before)). The loss of molecular weight in the experiments B3–B5 was due to an easily avoidable time lag between polymerization and demonomerization, during which a complete exclusion of air could not be assured.

Further variant embodiments and advantages of the invention will become apparent from the ensuing claims.

What is claimed is:

1. A method for producing polyoxymethylene having a residual monomer content of less than 2 weight %, comprising treating crude polyoxymethylene containing residual monomer dry with a pure pressureless superheated water Vapor gaseous medium that is inert to polyoxymethylene, wherein the residual monomer is at least partially in the form of a cyclic formaldehyde derivative, and wherein the gaseous medium contains at least 10 volume % of water vapor, and less than 0.1 volume % of a volatile base, and less than 1 volume % of a volatile solvent, so that polyoxymethylene having a residual monomer content of less than 2 weight % is obtained thereby.

2. A method for producing polyoxymethylene having a residual monomer content of less than 2 weight %, comprising treating crude polyoxymethylene containing residual monomer dry with a gaseous medium at a temperature of between 114° C. and the softening temperature of the crude polyoxymethylene and at a pressure of less than $1.2 \times 10^5$ Pa, wherein the residual monomer is at least partially in the form of a cyclic formaldehyde derivative, and wherein the gaseous medium is inert to polyoxymethylene and contains at least 10 volume % of water vapor, so that polyoxymethylene having residual monomer content of less than 2 weight % is obtained thereby.

3. The method of claim 1 or claim 2, which further comprises the step of adding stabilizers after said treating crude polyoxymethylene.

4. The method of claim 1, wherein the crude polyoxymethylene is treated at a temperature between 114° C. and its softening temperature and at a pressure of less than $1.2 \times 10^5$ Pa.

5. The method of claim 2 or claim 4, wherein the crude polyoxymethylene is treated at a temperature between 115 and 135° C.

6. The method of claim 5, wherein the crude polyoxymethylene is treated at a temperature between 120 and 130° C.

7. The method of claim 1 or claim 2, wherein the crude polyoxymethylene is treated for from 10 to 300 minutes.

8. The method of claim 1, wherein the crude polyoxymethylene is treated for from 30 to 180 minutes.

TABLE 1

| Experiment or Example | Treatment Temperature °C. | Duration of Treatment, Min | Water Vapor, g per h and per kg Crude POM | Weight % Trioxane | | MFI g/10 min; 190° C., 2.16 kp | |
|---|---|---|---|---|---|---|---|
| | | | | Before | After | Before | After |
| V 1 | 126 | 120 | 51.9 | 10.0 | 1.20 | 7.6 | 6.6 |
| V 2 | 130 | 120 | 18 | 4.2 | 0.98 | — | — |
| V 3 | 128 | 180 | 18 | 8.52 | 1.37 | 12.1 | 13.4 |
| B 1 | 130 | 120 | 61 | 7.42 | 1.14 | — | — |
| B 2 | 125 | 180 | 48 | 10.0 | 0.33 | — | — |
| B 3 | 125 | 150 | 25 | — | 0.07 | 10.3 | 13.4 |
| B 4 | 125 | 90 | 20 | 4.68 | 1.57 | 11.0 | 15.0 |
| B 5 | 120 | 90 | 15 | 4.0 | 1.48 | 11.0 | 12.6 |

9. The method of claim 3, wherein the superheated water vapor is passed through the crude polyoxymethylene at a concentration of between 1 to 200 g per kg of crude polyoxymethylene per hour.

10. The method of claim 9, wherein the concentration of superheated water vapor is between 10 to 70 g per kg of crude polyoxymethylene per hour.

11. The method of claim 1 or claim 12, wherein the crude polyoxymethylene is comminuted immediately prior to treatment with the gaseous medium.

12. The method of claim 1, wherein the treatment of the crude polyoxymethylene is effected on a continuous basis using a shaft dryer in a countercurrent process, and the water vapor and residual monomer forms a mixtures that condenses at from 60° to 80° C. and is transferred to a separate processing operation.

13. The method of claim 1 or claim 2, wherein the crude polyoxymethylene is selected from the group consisting of a homopolymer of formaldehyde, a homopolymer of trioxane, a copolymer of trioxane, or mixtures thereof.

* * * * *